US006728364B2

(12) United States Patent
Easter et al.

(10) Patent No.: US 6,728,364 B2
(45) Date of Patent: Apr. 27, 2004

(54) ANALOG PHONE BANK CONNECTOR

(75) Inventors: William Graham Easter, Orlando, FL (US); Dale Delano Evans, Winter Garden, FL (US); John Albert Maze, III, Clermont, FL (US); Frank Miceli, Orlando, FL (US)

(73) Assignee: Agere Systems, Inc., Allentown, PA (US)

( * ) Notice: Subject to any disclaimer, the term of this patent is extended or adjusted under 35 U.S.C. 154(b) by 566 days.

(21) Appl. No.: 09/821,557

(22) Filed: Mar. 29, 2001

(65) Prior Publication Data

US 2002/0141567 A1 Oct. 3, 2002

(51) Int. Cl.[7] ................................................. H04M 5/00
(52) U.S. Cl. ......................... 379/326; 379/325; 379/327
(58) Field of Search ............................. 379/167.01, 171, 379/326, 327, 328, 329, 332, 334, 413.02, 413.04, 325

(56) References Cited

U.S. PATENT DOCUMENTS

| | | | |
|---|---|---|---|
| 4,290,664 A | | 9/1981 | Davis et al. |
| 4,362,905 A | | 12/1982 | Ismail |
| 4,658,418 A | | 4/1987 | Rodgers |
| 4,712,232 A | | 12/1987 | Rodgers |
| 4,796,289 A | * | 1/1989 | Masor ...................... 379/27.07 |
| 4,852,153 A | * | 7/1989 | Streck ................... 379/100.15 |
| 4,861,287 A | | 8/1989 | Bevacqua et al. |
| 4,944,698 A | | 7/1990 | Siemon et al. |
| 4,952,163 A | | 8/1990 | Dola et al. |
| 5,083,941 A | | 1/1992 | Rodgers et al. |
| 5,623,537 A | | 4/1997 | Ensor et al. |
| 5,696,820 A | * | 12/1997 | Pelegris et al. ........ 379/413.04 |
| 5,784,456 A | | 7/1998 | Carey et al. |

* cited by examiner

Primary Examiner—Bing Bui
(74) Attorney, Agent, or Firm—David G. Maire; Beusse Brownlee Wolter Mora & Maire, P.A.

(57) ABSTRACT

A connector and associated method for interconnecting a plurality of adjacent paired wire terminations on a standard 110 style punch down wiring block for a telephone system. The connector includes two isolated conductors disposed along the length of the connector body and a plurality of pins connected to the respective conductors and extending away from the body. The pins are adapted for insertion into respective 110 style punch down block terminations when the connector is installed in a connected position on the wiring block, thereby connecting in parallel a plurality of telephones hard-wired to the adjacent paired wire terminations. The connector may be formed to have one or more break points disposed between respective pairs of the pins for easy breaking/cutting of the connector to a desired length for interconnecting a predetermined number of telephones. The connector may further include pairs of legs formed on opposed sides of the pins, with each leg having an indentation for receiving a mating projection formed on the wiring block for snap connection to the wiring block.

9 Claims, 2 Drawing Sheets

ANALOG PHONE BANK CONNECTOR

BACKGROUND OF THE INVENTION

This invention relates generally to the field of telephone systems, and more particularly, to telephone wiring interchange equipment, and specifically to a device and method for interconnecting a plurality of analog phones with a single telephone line.

Locations such as offices, manufacturing complexes, and apartment buildings may contain numerous telephones at numerous locations. The various telephones are connected to incoming telephone lines, with each telephone line being serviced by the international telephone system and accessible via a unique telephone number. A single location may have a plurality of incoming telephone lines, and the interconnection of telephones and incoming telephone lines may need to change periodically as the number, location and requirements of the location occupants change. This interconnection is typically accomplished via a central telephone interchange wiring panel or terminal board installed at the site. One such terminal board is a model 110 wiring block supplied by Lucent Technologies, Inc. Each telephone or telephone outlet for the location is hard-wired to a 110 style wiring block. The front side of the 110 style wiring block may be provided with punch down connecting blocks. An incoming telephone line may be connected to a given telephone by connecting the incoming line to the connecting block corresponding to the desired telephone. This connection is accomplished by pushing the insulated incoming telephone line wire down into a selected groove formed in the connecting block termination using a special punch down tool. A pair of metallic knife edge conductors disposed within the groove cut into the insulation and make electrical contact with the telephone wire as it is forced into the groove. Subsequently, the incoming telephone wire may be removed from the termination by simply pulling the wire out of the groove, thereby allowing the respective telephone to be connected to a different incoming telephone line.

In some applications, a plurality of telephones are connected in parallel to a single incoming telephone line. This type of connection is common in manufacturing plants where a large physical space is serviced by a single incoming telephone line, and where it is desirable to have more than one telephone within the space in order to make it more convenient for users to access the telephone line. It is also common to have this type of connection in an office environment where a plurality of offices are provided with telephones, but there are less incoming telephone lines than there are telephones, thus necessitating the sharing of phone lines among several offices. If digital telephone service is provided in these applications, a simple programming change is all that is required to interconnect several telephones in parallel to a single incoming telephone line. However, if analog service is being used, all interconnections must be made manually at the central telephone interchange wiring panel. The process of making such connections is labor intensive, as described above. Furthermore, the use of the special punch down tool and the handling of the small telephone wires makes this work very difficult for some physically challenged workers.

BRIEF SUMMARY OF THE INVENTION

Thus there is a particular need for an apparatus and method that simplifies the interconnection of a plurality of telephones to a single telephone line.

A connector is described herein for making parallel connections among a plurality of wire pair terminations disposed along a length of a punch down wiring block for a telephone system. The connector includes: a body having a length adapted to extend along the length of the wiring block and adapted for attachment to the wiring block in a connected position; a first conductor disposed along the length of the body; a second conductor electrically isolated form the first conductor and disposed along the length of the body; a first plurality of conductive pins connected to the first conductor and projecting from the body to make electrical contact with first alternate ones of the wiring block wire terminations when the body is in the connected position; and a second plurality of conductive pins connected to the second conductor and projecting from the body to make electrical contact with second alternate ones of the wiring block wire terminations when the body is in the connected position.

A method is disclosed herein for connecting a plurality of analog phones in parallel to a single incoming telephone line. The method includes: identifying a plurality of adjacent wire pair terminations disposed along a length of a punch down wiring block, the plurality of wire pair terminations connected to a respective plurality of analog telephones; connecting an incoming telephone line to one of the plurality of adjacent wire pair terminations; providing a connector adapted for attachment across the plurality of adjacent wire pair terminations, the connector comprising: a body having a length adapted to extend along the length of the wiring block and adapted for attachment to the wiring block in a connected position; a first conductor disposed along the length of the body; a second conductor electrically isolated form the first conductor and disposed along the length of the body; a first plurality of conductive pins connected to the first conductor and projecting from the body to make electrical contact with first alternate ones of the wiring block wire terminations when the body is in the connected position; and a second plurality of conductive pins connected to the second conductor and projecting from the body to make electrical contact with second alternate ones of the wiring block wire terminations when the body is in the connected position; and installing the connector into the connected position to connect the respective plurality of analog telephones in parallel to the incoming telephone line.

DETAILED DESCRIPTION OF THE INVENTION

Figure 1:
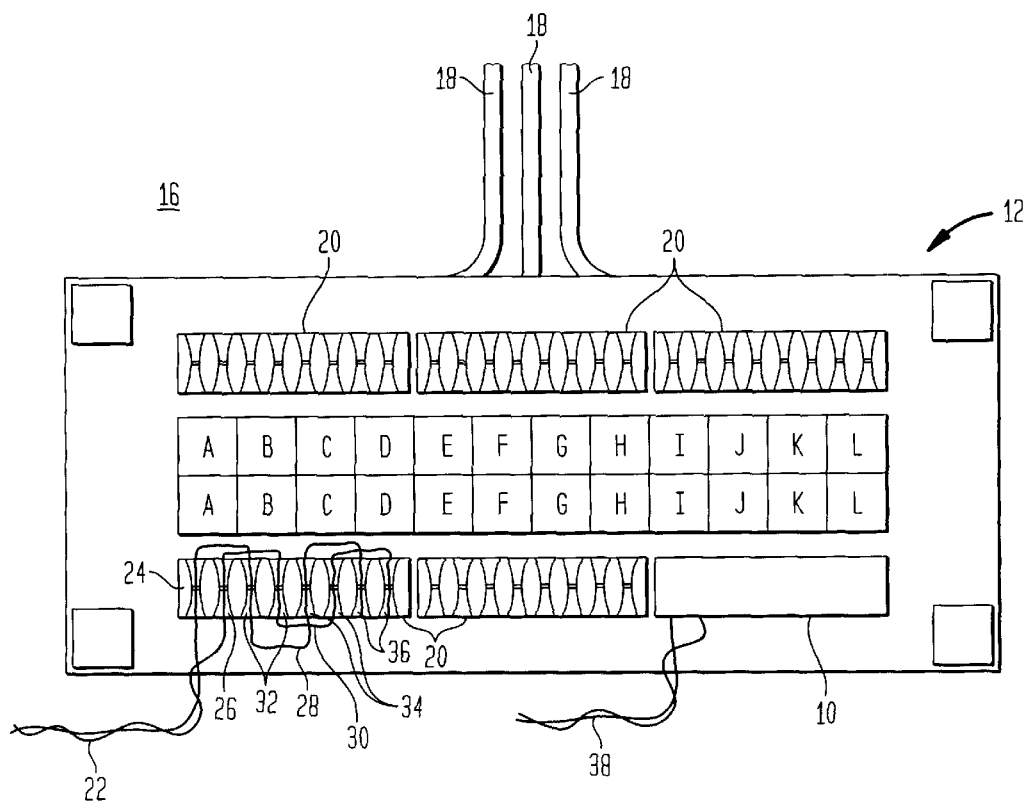
FIG. 1 is a plan view of a telephone system terminal board showing the parallel interconnection of a plurality of telephones with a single incoming telephone line using both a prior art wiring method and using a connector in accordance with the present invention.
Figure 2:
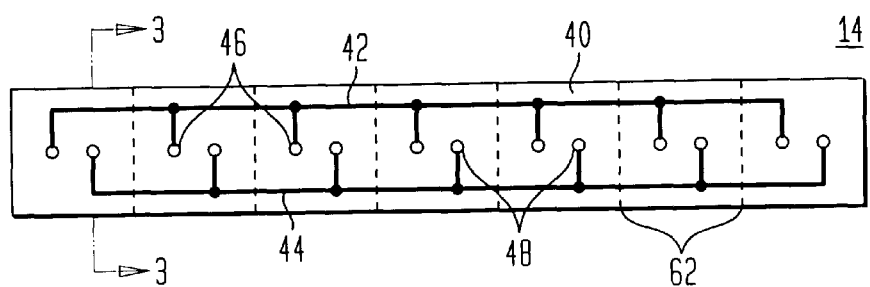
FIG. 2 is a top view of a connector in accordance with the present invention made from a clear material to illustrate its interior wiring.
Figure 3:
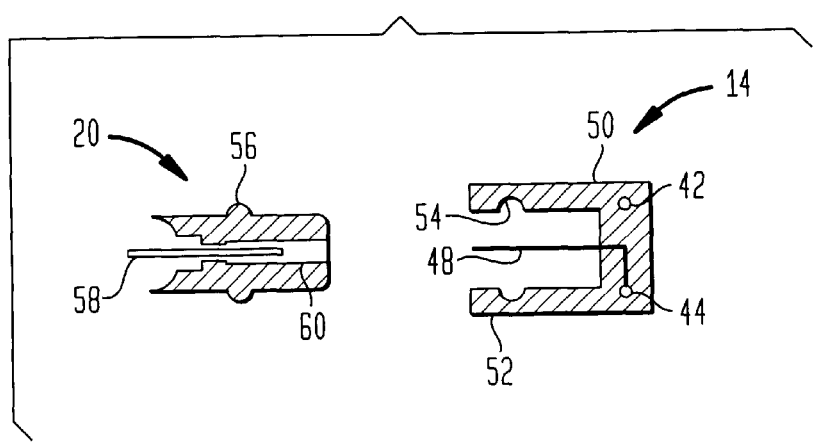
FIG. 3 is a side sectional view of the connector of FIG. 2 as viewed along section 3—3 shown in relation to a mating punch down block connector, also illustrated in side sectional view.

A connector 10 used for interconnecting a plurality of telephones in parallel is illustrated in FIG. 1 as it may be installed on a punch down wiring block 12 forming part of a telephone system. A top view of a similar connector 14 formed of a clear material to show its interior wiring is shown in FIG. 2. A side sectional view of connector 14 as viewed along section 3—3 of FIG. 2 is shown in FIG. 3. FIG. 1 illustrates the prior art technique for interconnecting a plurality of telephones in parallel as well as one embodiment of the present invention.

A portion of a telephone system 16 is illustrated in FIG. 1 as having a plurality of wires 18 connected to a respective plurality of telephone stations (not shown). The telephone stations may be telephones or telephone jacks of any style known in the art. The wires 18 include a wire grouping for each telephone station, with at least one wire pair in each wire grouping. Because two conductors are necessary for an electrical connection, a telephone configuration having two wires per telephone is described herein, although one skilled in the art may appreciate that the invention is not limited to applications having only two wires per telephone. Each wire pair is electrically connected to a respective pair of rear side connection points (not shown) on wiring block 12. One such terminal board is a model 110 wiring block supplied by Lucent Technologies, Inc., assignee of the present invention. The illustrated front side of wiring block 12 includes a plurality of connecting blocks 20 as are known in the art. Such connecting blocks 20 are designed to be inserted onto mating portions of the rear side connection points, thereby providing a front side location for making replaceable electrical connections to each of the respective individual conductors contained within wires 18. Wiring block 12 is designed to be mounted on a wall, preferably in a telephone wiring cabinet area of a location having a plurality of telephones.

Incoming telephone line 22 is illustrated in FIG. 1 as being connected to a plurality of telephones by the prior art technique. An incoming telephone line 22 includes at least a wire pair connected to a telephone service provider and associated with a unique telephone number. In some locations, the incoming telephone line 22 may be connected to a Private Branch Exchange (PBX) system (not shown). The incoming telephone line 22 is shown as being attached to paired wire terminations 24, 26 for electrical connection with the associated telephone station through wires 18. Incoming telephone line 22 is connected to terminations 24, 26 using a known punch down tool and procedure. Incoming telephone line 22 is also connected in parallel to three other telephone stations through wires 18 by means of jumper wires 28, 30. Jumper wires 28, 30 are connected to respective wire pair terminations 32, 34, 36, thereby providing the parallel electrical connections to the associated telephone stations. Jumper wires 28, 30 are connected to paired wire terminations 32, 34, 36 using known punch down tools and procedures. One may appreciate that this prior art procedure is very time consuming and manually difficult, since each jumper wire 28, 30 must be manually fed into the respective groove formed in the punch down block connector 20, and then must be pressed into the groove using a special punch down tool.

A second incoming telephone line 38 is connected in parallel to four telephone stations in accordance with the present invention by connector 10. Connector 10 is attached to one or more punch down block connectors 20, as will be more fully described below. In the embodiment of FIG. 1, connector 10 is disposed directly over one of the punch down block connectors 20 in the lower right hand corner of punch down wiring block 12. In the view of FIG. 1, the top surface of connector 10 is visible and it blocks from view the underlying punch down block connector 20. In this embodiment, the length of connector 10 matches the length of one punch down block connector 20, but in other embodiments the respective lengths may be different. Incoming telephone line 38 includes at least a wire pair that is connected to a respective pair of wire terminations using the known punch down technique. In the embodiment of FIG. 1, such connection is made to the wire pair labeled as "I" on the lower row of terminal block 12, and is hidden from view by the presence of connector 10. Connector 10 is then installed into its connected position, as illustrated, to provide a parallel connection to respective wire pairs labeled as "J", "K" and "L" on the lower row of terminal block 12. Accordingly, incoming telephone line 38 is thereby connected in parallel to the associated four telephone stations through wires 18 attached to the respective rear side connection points.

Details of the interior wiring of a connector 14 in accordance with this invention can be seen in FIGS. 2 and 3. The connector 14 of FIG. 2 is similar in design and concept to the connector 10 of FIG. 1, with the exception that it is longer and formed to interconnect up to seven wire pairs rather than the four wire pairs of connector 10. Connector 14 includes a body portion 40 that may be formed of an injection molded plastic material through processes known in the art. Body 40 is illustrated as being formed of a transparent plastic material so that its interior structures may be seen in FIG. 2. The similar connector 10 of FIG. 1 is illustrated as being made of an opaque material so that the interior wiring is not visible. Connector 14 includes a first conductor 42 and a second conductor 44 disposed along the length of the body 40 and electrically isolated from each other by the insulating properties of the material of body 40. Each conductor 42, 44 may be a wire formed of copper, aluminum or other electrically conductive material having a size sufficient to carry a telephone signal. Conductor 42 is connected to a plurality of conductive pins 46, and conductor 44 is connected to a plurality of conductive pins 48. Each pin 46, 48 extends beyond the body 40, as can be seen in FIG. 3. Pins 46, 48 are disposed in respective alternating pairs along the length of connector 14. Connector 14 is formed to have a generally U-shaped cross-section, as can be seen in FIG. 3, with leg portions 50, 52 projecting on opposed sides of each pin 46, 48. At least one of the legs 50, 52 may be formed to have an indentation 54 adapted for receiving a projection 56 formed on mating connecting block 20. Such projections are known in the art as formed on a standard model 110 connecting blocks supplied by Lucent Technologies, Inc. Legs 50, 52 are somewhat flexible and may be snapped over the respective projections to place the connector 14 in a connected position on a wiring block 12, as illustrated in FIG. 1. When in such connected position, pins 46, 48 make electrical contact with respective ones of the wiring block wire terminations 58, thereby connecting alternating pairs of wire terminations in parallel through conductors 42, 44. Pins 46, 48 are formed of a conductive material having a level of strength sufficient to prevent the bending of the pins 46, 48 as they are inserted into the metallic knife edge conductors in the grooves 60 on the front side of a connecting block 20.

Connector 14 further includes at least one break point 62 formed in the body 40 and disposed between respective pairs of pins 46, 48. The break points 62 facilitate the cutting or breaking of the connector 14 in two or more portions having respective predetermined lengths. In this manner, a large connector 14 may be cut or broken to form a smaller connector 10 to interconnect a predetermined number of telephones hard-wired to adjacent paired wire terminations. Break points 56 are illustrated as a plurality of perforations formed in the material of the body 40, but other embodiments may be envisioned for providing a plane of relatively weak or brittle material at predetermined locations within the body 40.

A method of wiring a telephone system 16 to interconnect a plurality of telephones to a single telephone line 38 may incorporate the use of a connector 10 as described above. A plurality of adjacent paired wire terminations, such as those marked "I" through "L" in FIG. 1, are identified and hard-wired to a plurality of telephone stations including analog telephones and/or phone outlets. An incoming telephone line 38 is connected to one of the selected wire pairs using a punch down tool as is known in the art. A connector 10, formed as described above, is then provided and installed into a connected position on the front side of the respective connecting block(s) 20 to interconnect the plurality of telephone stations to the single incoming telephone line 38. The connector 10 may be formed by breaking a larger connector 14 along at least one break point 56 to obtain a connector 10 of the desired length. The connector is placed into the connected position by snapping its opposed legs 50, 52 over projections formed on the sides of connecting block 20. The process may be reversed easily by pulling the connector 10 off of the connecting block 20 and pulling the incoming telephone wire 38 out of the knife edge conductors 60 within the connecting block 20. Accordingly, a plurality of analog telephones may be interconnected to a single incoming telephone line with a reduced amount of skilled labor.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A connector for making parallel connections among a plurality of paired wire terminations disposed along a length of a punch down wiring block for a telephone system, the connector comprising:
    a body having a length adapted to extend along the length of the wiring block and adapted for attachment to the wiring block in a connected position;
    a first conductor disposed along the length of the body;
    a second conductor electrically isolated form the first conductor and disposed along the length of the body;
    a first plurality of conductive pins connected to the first conductor and projecting from the body to make electrical contact with first alternate ones of the wiring block wire terminations when the body is in the connected position; and
    a second plurality of conductive pins connected to the second conductor and projecting from the body to make electrical contact with second alternate ones of the wiring block wire terminations when the body is in the connected position.

2. The connector of claim 1, further comprising a plurality of break points disposed between respective adjacent pairs of conductive pins, the break points adapted to facilitate the separation of the connector into portions having respective predetermined lengths.

3. The connector of claim 1, wherein the body further comprises a pair of projecting legs formed on opposed sides of each conductive pin for releasable connection with the wiring block.

4. The connector of claim 3, where at least one of the pair of opposed legs comprises an indentation adapted to receive a projection formed on the wiring block for forming a releasable attachment there between.

5. The connector of claim 1, wherein the body comprises an injected molded plastic material.

6. A telephone system comprising:
    a wiring block having a plurality of connection points adapted for connection to a plurality of telephone stations;
    a connecting block attached to the wiring block, the connecting block comprising a plurality of paired wire terminations connected to the respective plurality of wiring block connection points;
    a connector releasably attached to the connecting block, the connector further comprising:
        a body having a length adapted to extend along a length of the connecting block and adapted for attachment to the connecting block in a connected position;
        a first conductor disposed along the length of the body;
        a second conductor electrically isolated from the first conductor and disposed along the length of the body;
        a first plurality of conductive pins connected to the first conductor and projecting from the body to make electrical contact with first alternate ones of the connecting block wire terminations when the body is in the connected position; and
        a second plurality of conductive pins connected to the second conductor and projecting from the body to make electrical contact with second alternate ones of the connecting block wire terminations when the body is in the connected position.

7. The telephone system of claim 6, further comprising:
    an incoming telephone line connected to one of the paired wire terminations; and
    a plurality of telephones connected to respective wiring block connection points, the plurality of telephones being interconnected in parallel to the incoming telephone line by the connector.

8. In a telephone system wherein a plurality of analog telephones are pre-wired to a respective plurality of paired wire terminations disposed along a length of a punch down wiring block, a method for connecting a plurality of analog phones in parallel to a single incoming telephone line, the method comprising:

identifying a plurality of adjacent paired wire terminations disposed along a length of the wiring block, the plurality of paired wire terminations connected to a respective plurality of analog telephones;

connecting an incoming telephone line to one of the plurality of adjacent paired wire terminations;

providing a connector adapted for attachment across the plurality of adjacent paired wire terminations, the connector comprising:

a body having a length and adapted for attachment to the wiring block in a connected position;
a first conductor disposed along the length of the body;
a second conductor electrically isolated form the first conductor and disposed along the length of the body;
a first plurality of conductive pins connected to the first conductor and projecting from the body to make electrical contact with first alternate ones of the wiring block wire terminations when the body is in the connected position; and
a second plurality of conductive pins connected to the second conductor and projecting from the body to make electrical contact with second alternate ones of the wiring block wire terminations when the body is in the connected position;

the method further comprising installing the connector into the connected position to connect the respective plurality of analog telephones in parallel to the incoming telephone line.

9. The method of claim 8, further comprising:

providing the connector with a plurality of break points disposed between respective pairs of conductive pins, the break points adapted to facilitate the separation of the connector into portions having respective predetermined lengths; and breaking the connector along one of the break points to form a connector adapted for attachment across a desired number of adjacent paired wire terminations.

* * * * *